US012230174B2

(12) United States Patent
Hu et al.

(10) Patent No.: US 12,230,174 B2
(45) Date of Patent: Feb. 18, 2025

(54) METHOD AND SYSTEM FOR SIMULTANEOUSLY DISPLAYING DATA BY DATA CLASSIFICATION

(71) Applicants: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORPORATION, New Taipei (TW)

(72) Inventors: Sheng-Hsiung Hu, New Taipei (TW); Che-Hung Yeh, New Taipei (TW)

(73) Assignees: Inventec Appliances (Pudong) Corporation, Shanghai (CN); Inventec Appliances (Shanghai) Co., Ltd., Shanghai (CN); Inventec Appliances Corp., New Taipei (TW)

( * ) Notice: Subject to any disclaimer, the term of this patent is extended or adjusted under 35 U.S.C. 154(b) by 0 days.

(21) Appl. No.: 18/529,097

(22) Filed: Dec. 5, 2023

(65) Prior Publication Data

US 2024/0339055 A1 Oct. 10, 2024

(30) Foreign Application Priority Data

Apr. 6, 2023 (TW) ................................ 112112824

(51) Int. Cl.
*G09G 3/00* (2006.01)

(52) U.S. Cl.
CPC ..... *G09G 3/001* (2013.01); *G09G 2320/0209* (2013.01); *G09G 2320/028* (2013.01); *G09G 2370/022* (2013.01)

(58) Field of Classification Search
CPC ........... G02B 27/0075; G02B 27/0093; G02B 30/10; G02B 30/20; G02B 30/27;
(Continued)

(56) References Cited

U.S. PATENT DOCUMENTS

| | | | | |
|---|---|---|---|---|
| 2012/0314021 A1* | 12/2012 | Tsang | G03H 1/2294 348/40 |
| 2018/0146184 A1* | 5/2018 | Yang | H10K 59/35 |
| 2024/0013690 A1* | 1/2024 | Lussier | G06V 40/193 |

FOREIGN PATENT DOCUMENTS

| | | |
|---|---|---|
| TW | 201136296 A | 10/2011 |
| TW | 202304208 A | 1/2023 |

OTHER PUBLICATIONS

First Office Action mailed to Taiwanese Counterpart Patent Application No. 112112824 dated Apr. 3, 2024.

* cited by examiner

*Primary Examiner* — Nelson M Rosario
(74) *Attorney, Agent, or Firm* — Rosenberg, Klein & Lee

(57) ABSTRACT

A method for simultaneously displaying data by data classification comprises the following steps of: setting a plurality of view angle zones of a multi-layer display; analyzing and classifying at least one data according to the view angle zones and a data classification command to generate a plurality of image data sets; arranging the image data sets according to the view angle zones; setting a plurality of view angle buffer zones located among the view angle zones, and adding a plurality of buffer image data sets among the image data sets according to the view angle buffer zones; and the multi-layer display simultaneously displaying the image data sets and the buffer image data sets according to the view angle zones and the view angle buffer zones.

9 Claims, 6 Drawing Sheets

(58) Field of Classification Search
CPC ......... G06F 3/013; G06T 15/06; G06T 15/20; G06V 40/19; G06V 40/193; G09G 3/002; G09G 2354/00; G09G 2380/08; G09G 3/003
See application file for complete search history.

METHOD AND SYSTEM FOR SIMULTANEOUSLY DISPLAYING DATA BY DATA CLASSIFICATION

BACKGROUND OF THE INVENTION

1. Field of the Invention

The present invention relates to a method and system for displaying data, and more particularly, to a method for simultaneously displaying data by data classification.

2. Description of the Prior Art

With the development of technology and the improvement of living standards, the functions and demands of many products have increased. Take the display industry as an example, in addition to increasing the resolution and refresh rate of display devices, the types of images and display modes presented by display devices are also trending towards diversification.

In a typical display, the display can only show a single 2D static image or dynamic image, and all information is presented on the same screen. Taking flight information at an airline station as an example, when the display shows flight information, all the airlines, flights, and related information will be shown at the same time. Therefore, travellers usually need to gather in front of the display and look up the contents of the images one by one to find the flight information, which not only causes road congestion but also reduces convenience and efficiency. In addition, since typical displays can only display 2D images, the display industry has developed multi-layer displays to display 3D images in order to enhance the viewer's visual experience.

The multi-layer displays currently on the market are a combination of 2D displays and gratings to split a 3D image into multiple consecutive 2D images and project them to multiple view angles. Generally, the multi-layer display can produce a physical total view angle Y, and the 3D image can be split into K 2D image data arrangements, i.e., the total view angle has K images. When the multi-layer display is split into P view angle zones, each of the view angle zones can see K/P images. When the viewer moves from one of the view angle zone to the next one, the multi-angle images are transmitted to the viewer's left and right eyes to form a 3D image. However, the maximum distance between two adjacent images presented by existing multi-layer displays is the pupil distance of the human eye. When the viewer is located in the view angle zone between the two images, the viewer's left eye will see one image and the right eye will see the other image. In other words, the viewer will see overlapping images at the same time, resulting in a crosstalk situation. In addition, in the prior art, multi-layer displays can only display a single 3D image. If the multi-layer display needs to present other data, it still needs to turn off the 3D image and display the other images, so as to reduce the practicability and applicability.

Therefore, it is necessary to develop a new display method to solve the problems of the prior art.

SUMMARY OF THE INVENTION

In view of this, one scope of the present invention is to provide a method for simultaneously displaying data by data classification to solve the problems of the prior art.

In an embodiment, the method for simultaneously displaying data by data classification of the present invention comprises the following steps of: setting a plurality of view angle zones of a multi-layer display; analyzing and classifying at least one data according to the view angle zones and a data classification command to generate a plurality of image data sets; arranging the image data sets according to the view angle zones; setting a plurality of view angle buffer zones located among the view angle zones, and adding a plurality of buffer image data sets among the image data sets according to the view angle buffer zones; and the multi-layer display simultaneously displaying the image data sets and the buffer image data sets according to the view angle zones and the view angle buffer zones.

In summary, the method and system for simultaneously displaying data by data classification of the present invention can enable the multi-layer display to simultaneously display different data contents at different angles by setting multiple view angle zones and classifying data, so the viewer can more quickly obtain specific information, so as to enhance convenience and efficiency. Moreover, the method and system for simultaneously displaying data by data classification of the present invention can separate different display images by buffering the image data to avoid crosstalk between the images. In addition, the method and system for simultaneously displaying data by data classification of the present invention can also display static and dynamic images in different view angle zones simultaneously, so as to enhance the practicality and applicability.

BRIEF DESCRIPTION OF THE APPENDED DRAWINGS

DETAILED DESCRIPTION OF THE INVENTION

Figure 1:
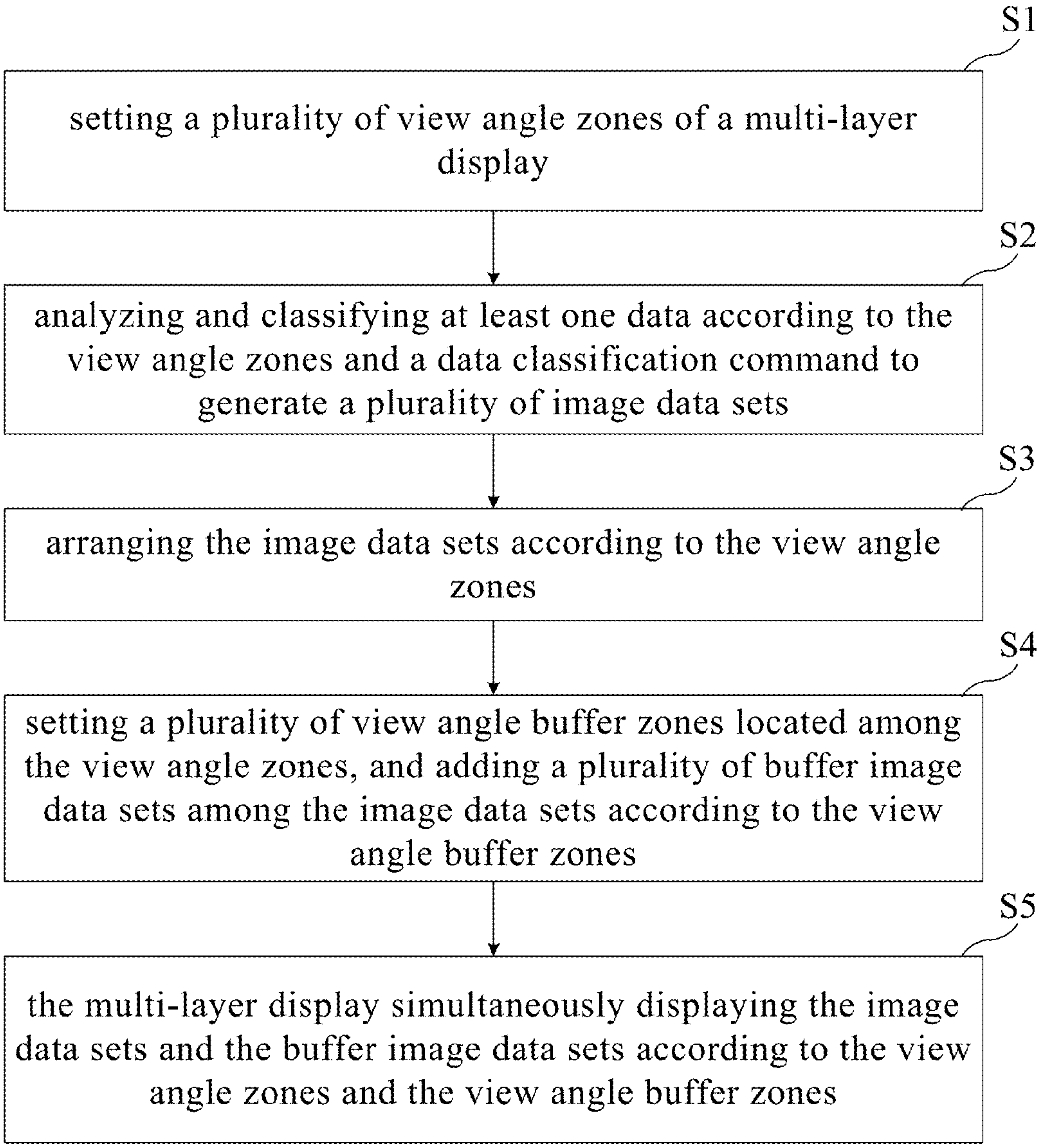
FIG. 1 is a flowchart illustrating a method for simultaneously displaying data by data classification according to an embodiment of the present invention.
Figure 3:
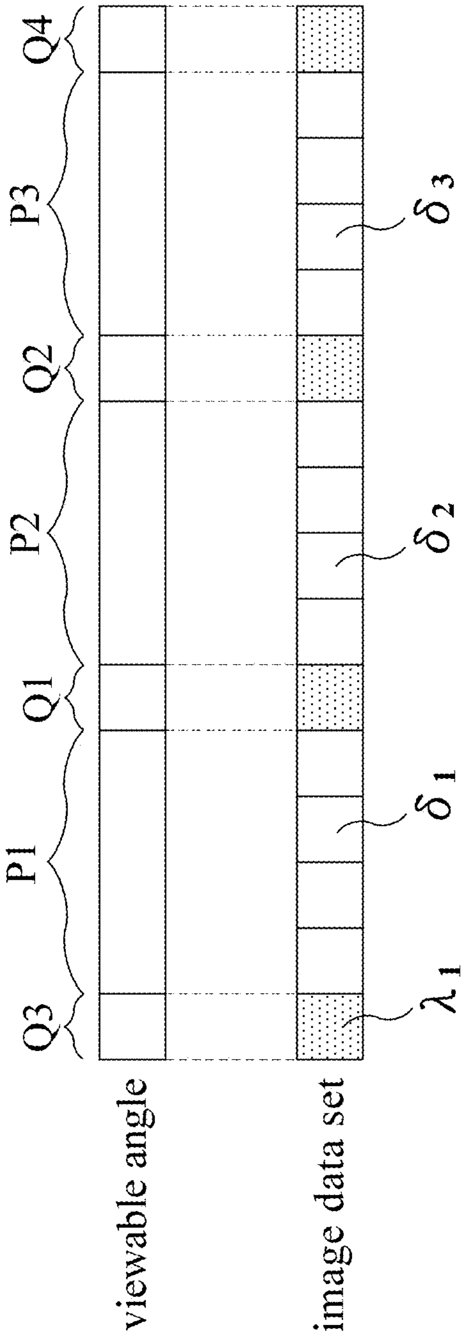
FIG. 3 is a schematic diagram illustrating an arrangement of image data sets and buffer image data sets according to an embodiment of the present invention.

Please refer to FIG. 1 and FIG. 3. FIG. 1 is a flowchart illustrating a method for simultaneously displaying data by data classification according to an embodiment of the present invention. FIG. 3 is a schematic diagram illustrating an arrangement of image data sets and buffer image data sets according to an embodiment of the present invention. As shown in FIG. 1, in the present embodiment, the method for simultaneously displaying data by data classification comprises step S1: setting a plurality of view angle zones of a multi-layer display; step S2: analyzing and classifying at least one data according to the view angle zones and a data classification command to generate a plurality of image data sets; step S3: arranging the image data sets according to the view angle zones; step S4: setting a plurality of view angle buffer zones located among the view angle zones, and adding a plurality of buffer image data sets among the image data sets according to the view angle buffer zones; and step S5: the multi-layer display simultaneously displaying the image data sets and the buffer image data sets according to the view angle zones and the view angle buffer zones.

The present invention categorizes one or more data and displays the categorized data simultaneously on the multi-layer display, and each of the categorized data is displayed in a different view angle of the multi-layer display. In step S1, the view angle zone is an angle zone value that the multi-layer display is intended to display the data content. In practice, the angle zone value of the view angle zones can be determined according to the value of the viewable angle range of the multi-layer display and the number of view angle zones. For example, when the viewable angle range of the multi-layer display is from −30 degrees to +30 degrees and the number of view angle zones is 5, each of the angle zone values of the view angle zones is 12 degrees. In addition, the angle zone value of the view angle zones can also be determined according to a specific value of the viewable angle range of the multi-layer display. For example, when the viewable angle range of the multi-layer display is from −30 degrees to +30 degrees, the total angle zone value of the view angle zones can be −10 degrees to +10 degrees. When the number of view angle zones is 4, each of the angle zone values of the view angle zones is 5 degrees. In practice, the angle zone value and the number of the view angle zones can be determined according to the design or requirements.

In step S2, the data can be text, picture, 2D image, 3D image, etc. or can be any visualized data. The data classification command can be a command that contains a plurality of classification rules or classification feature data. The classification rules or the classification feature data can be data types, specific text, graphics, etc. Therefore, the data classification command can analyze and classify the data to be displayed to generate the plurality of image data sets of different groups. For example, when the data is flight data and the data classification command is aircraft data, the image data sets can contain 2D image data of different aircraft data. When the data contains 2D images and 3D images and the data classification command is image type, the image data set can contain a 2D image data set and a 3D image data set.

Furthermore, the number of image data sets can correspond to the number of view angle zones, and each of the image data sets contains a plurality of image data. In practice, when the image data set is 2D image, each of the image data in the image data set is the same data content. When the image data set is 3D image, the plurality of image data in the image data set are continuous and sequential data. In addition, the number of the image data in the image data set can be the same, but is not limited to the above-mentioned, the number of image data can be determined according to the angle zone value of the view angle zones, the resolution of the image to be presented, and the viewable angle range. For example, when the angle zone value of the view angle zones is from 0 degrees to 10 degrees, the image data set can contain 5 image data, i.e., the viewable angle of one image data is 2 degrees. When the image data set is 3D image and the angle zone value of the view angle zones is from 10 degrees to 40 degrees, the image data set can contain at least 30 image data. That is, each of the angles of the view angle zone can contain a plurality of image data.

As shown in FIG. 1 and FIG. 3. In step S3, the image data sets can be arranged horizontally from left to right, and each of the image data sets can correspond to one view angle zone. In practice, the arrangement of the image data sets can be determined according to the order of the images to be presented in the view angle zone.

In step S4, the view angle buffer zones are the angle zone value covered by a visual buffer area, and each of the view angle buffer zones is located between two view angle zones. That is, the view angle zones and the view angle buffer zones are staggered. In practice, the view angle buffer zones can overlap and overlay the view angle zones, and the angle zone value of the view angle buffer zones can create visual widths that are larger than the interpupillary distance of the human eye. For example, the angle zone value of the first view angle zones is from +10 degrees to +20 degrees, the angle zone value of the second view angle zones is from +20 degrees to +30 degrees and the angle zone value of the view angle buffer zones can be set from +19 degrees to +21 degrees. Furthermore, the data in the buffer image data sets can be all-black images. Therefore, the image data sets and the buffer image data sets are staggered and there is an image buffer area between each of the image data sets. In practice, the data of the buffer image data sets is not limited to the data format of the all-black images, and the data of the buffer image data sets can be low-resolution image data or any image data that can be separated from the image data sets and has a high contrast ratio with the image data sets.

As shown in FIG. 3, the view angle zones comprise a first view angle zone P1, a second view angle zone P2, and a third view angle zone P3. The view angle buffer zones comprise a first view angle buffer zone Q1 and a second view angle buffer zone Q2. The image data set corresponding to the first view angle zone P1, the second view angle zone P2, and the third view angle zone P3 comprises four image data $\delta_1$, $\delta_2$ and $\delta_3$, respectively. The buffer image data set corresponding to the first view angle buffer zone Q1 and the second view angle buffer zone Q2 comprises one buffer image data $\lambda_1$. It is worth noting that the number of buffer image data corresponding to the buffer image data set in the view angle buffer zone is not limited to one as in FIG. 3, and the number of buffer image data can be determined according to the size of the view angle buffer zones.

In step S5, after the image data sets and the buffer image data sets are arranged, the multi-layer display can simultaneously display the image data sets and the buffer image data sets according to the view angle zones and the view angle buffer zones. In practice, when a user views the multi-layer display, the user can be able to view the images with different data contents at different view angle zones, and view a full-black image or low-resolution image data at the view angle buffer zone.

Therefore, the method for simultaneously displaying data by data classification of the present invention can enable the multi-layer display to simultaneously display different data contents at different angles by setting multiple view angle zones and classifying data, so the viewer can more quickly obtain specific information, so as to enhance convenience and efficiency. Moreover, the method and system for simultaneously displaying data by data classification of the present invention can separate different display images by buffering the image data to avoid crosstalk between the images.

Figure 2:
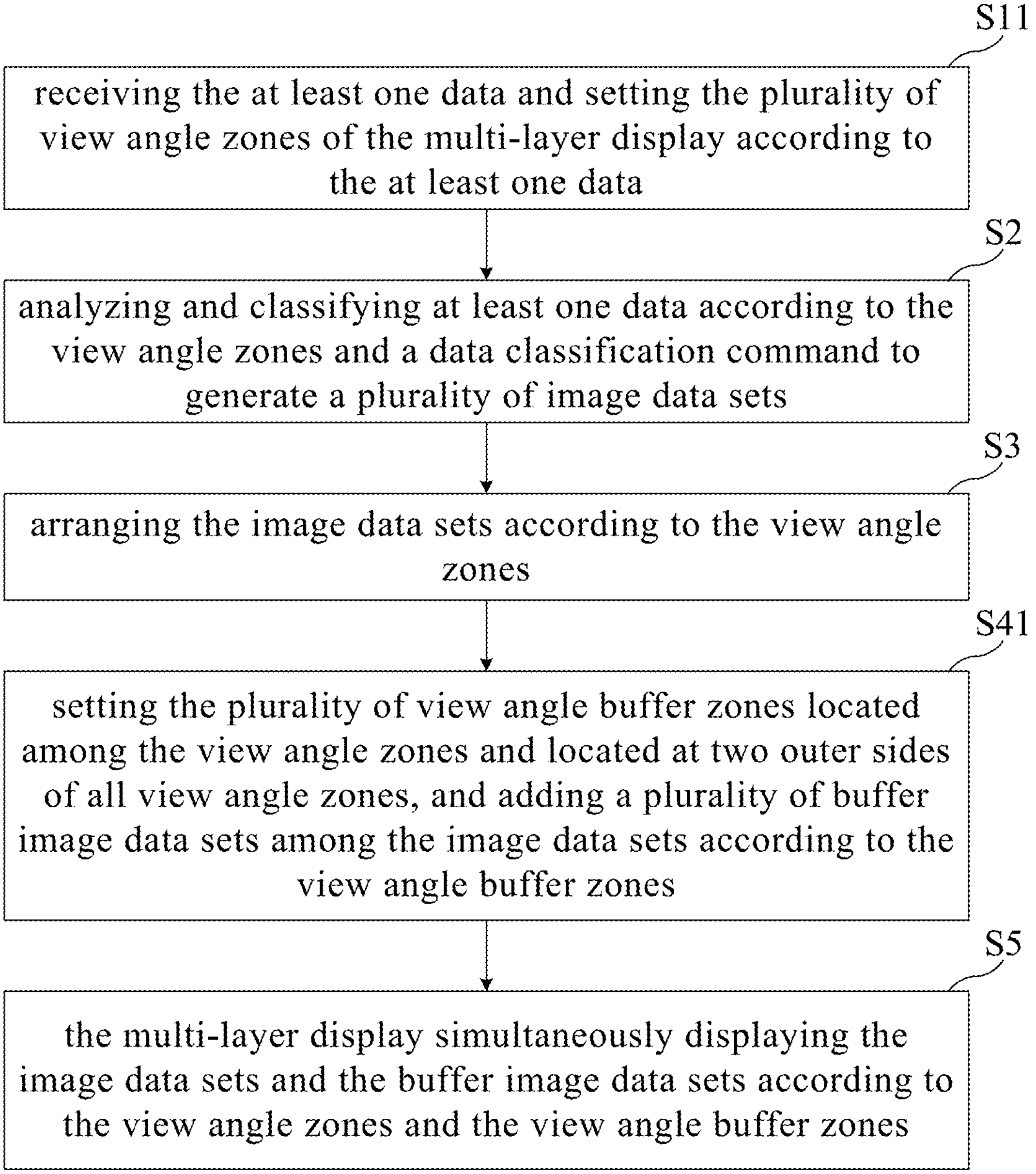
FIG. 2 is another flowchart illustrating a method for simultaneously displaying data by data classification according to an embodiment of the present invention.

Please refer to FIG. 1, FIG. 2 and FIG. 3. FIG. 2 is another flowchart illustrating a method for simultaneously displaying data by data classification according to an embodiment of the present invention. FIG. 2 is a flowchart of the further steps of FIG. 1. As shown in FIG. 2, step S1 of FIG. 1 can further comprise step S11: receiving the at least one data and setting the plurality of view angle zones of the multi-layer display according to the at least one data. In practice, the number of view angle zones of the multi-layer display can be determined according to the contents of the data, and the data classification command can also be determined according to the contents of the data. Furthermore, in the present embodiment, step S4 of FIG. 1 can further comprise step S41: setting the plurality of view angle buffer zones located among the view angle zones and located at two outer sides of all view angle zones. As shown in FIG. 3, in practice, the buffer image data sets corresponding to the view angle buffer zones (the third view angle buffer zone Q3, the fourth view angle buffer zone Q4) can also be located at the outer left and right sides of the multi-layer display to prevent the images close to the edges from being disturbed and becoming unclear, so as to enhance the display efficiency.

Therefore, when the number of the view angle zones is P, the number of the view angle buffer zones is Q, the number of the image data sets is δ, and the number of the buffer image data sets is λ, the total number (K) of the image data sets is given by:

$$K = \delta * P + \lambda * Q$$

$$Q = P + 1$$

$$V_i = [v_i v_i \ldots v_i]_1 * \lambda, \text{ wherein } i = 1, 2, \ldots, P$$

$$B_i = [b_i b_i \ldots b_i]_1 * \delta, \text{ wherein } i = 1, 2, \ldots, Q$$

wherein, $v_i$ is one of the image data sets, and $b_i$ is one of the buffer image data sets.

Furthermore, when the arranged image data sets and the buffer image data sets are input to the multi-layer display to be received and displayed on the multi-layer display, the data $X_j$) input to the multi-layer display is given by:

$$X_j = V_i, \text{ when } j = 2, 4, \ldots, (P + Q - 1)$$

$$X_j = B_i, \text{ when } j = 1, 3, \ldots, (P + Q)$$

In practice, the data can be sequentially input to the multi-layer display in the order of $X_1$, $X_2$, $X_3$, $X_4$ $X_5$ . . . , i.e., the multi-layer display can sequentially receive staggered buffer image data sets and image data sets. As shown in FIG. 3, the multi-layer display can sequentially receive the buffer image data sets and the image data sets corresponding to the view angle zones of Q3, P1, Q1, P2, Q2, P3, and Q4, respectively. Next, the multi-layer display displays the image data sets and the buffer image data sets according to the view angle zones and the view angle buffer zones. It is worth noting that although the image data sets and the buffer image data sets are sequentially input to the multi-layer display, the time interval between the input/transmission of each of the data is very short, and the multi-layer display displays the image data sets and the buffer image data sets at the same time.

Figure 4:
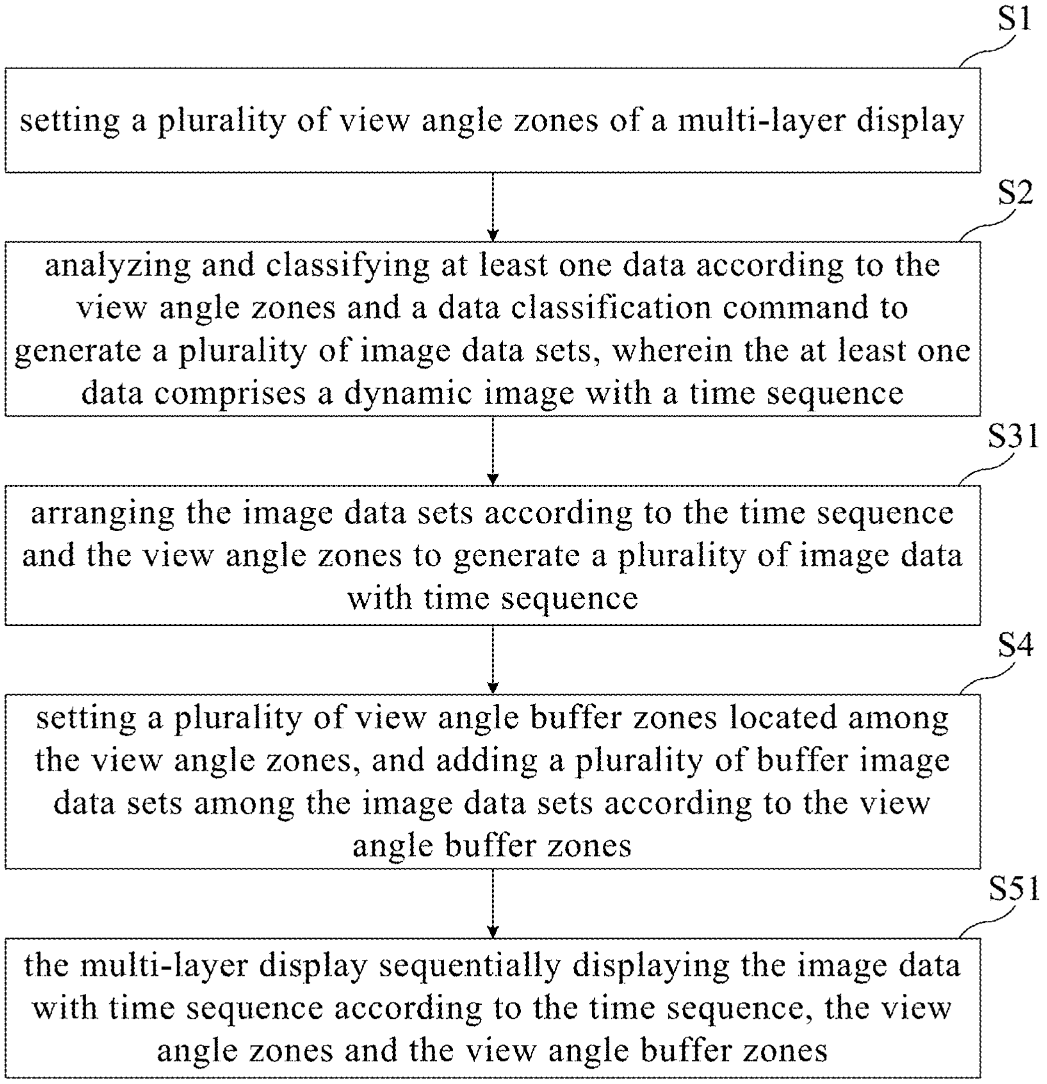
FIG. 4 is another flowchart illustrating a method for simultaneously displaying data by data classification according to an embodiment of the present invention.

The method for simultaneously displaying data by data classification of the present invention can display not only 2D and 3D static images, but also a combination of dynamic and static images. Please refer to FIG. 4. FIG. 4 is another flowchart illustrating a method for simultaneously displaying data by data classification according to an embodiment of the present invention. In the present embodiment, the at least one data further comprises a dynamic image with a time sequence. In step S2, when analyzing and classifying the at least one data comprising the dynamic images according to the view angle zones and the data classification command, the image data sets also contain 2D image data of each of the time points.

Next, step S31 is performed: arranging the image data sets according to the time sequence and the view angle zones to generate a plurality of image data with time sequence. For example, when the at least one data comprises 3D images and dynamic images, the plurality of image data sets comprise 3D image data and 2D image data at three different time points. At this time, the plurality of image data with time sequence can comprise a data arrangement set of the 3D image data and the 2D image data at the first time point, a data arrangement set of the 3D image data and the 2D image data at the second time point, and a data arrangement set of the 3D image data and the 2D image data at the third time point.

After performing step S4, each of the image data with time sequence comprises staggered image data sets and the plurality of buffer image data sets with different time points. Finally, step S51 is performed: the multi-layer display sequentially displaying the image data with time sequence according to the time sequence, the view angle zones and the view angle buffer zones. In practice, the data ($X_j$) input to the multi-layer display is $X_j$ (t), t=1, 2, . . . , T, wherein T is total playing time of the dynamic images, and the total playing time has the aforementioned time sequence. The multi-layer display can display the image data with time sequence cyclically from the first time point to the third time point to display the dynamic images in the corresponding dynamic view angle zones. The multi-layer display displays the 3D image data again at each of the time points to display 3D static images in the corresponding static view angle zones. Therefore, the method for simultaneously displaying data by data classification of the present invention can also display static and dynamic images in different view angle zones simultaneously, so as to enhance the practicality and applicability.

Figure 5:
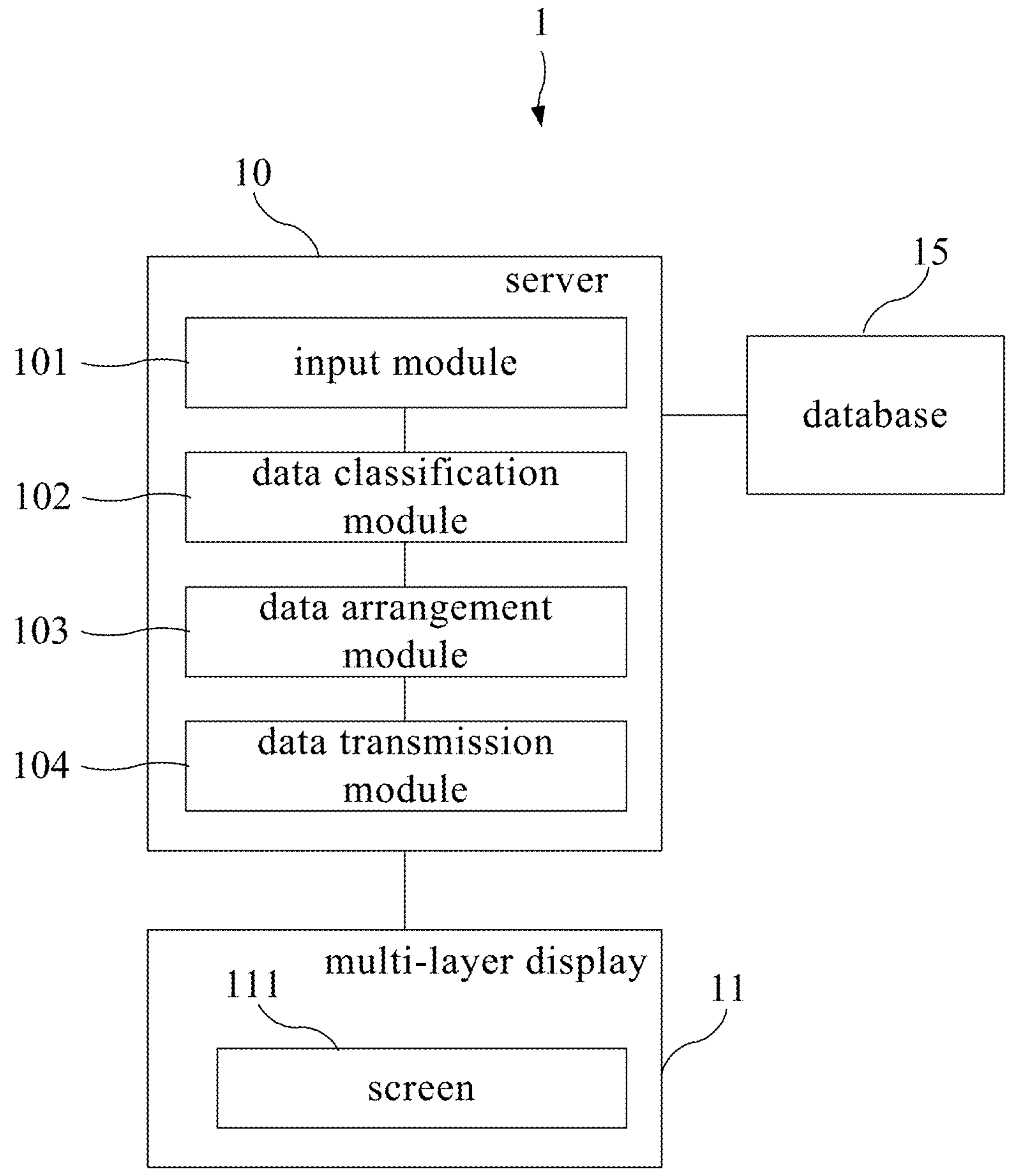
FIG. 5 is a function block diagram illustrating a system for simultaneously displaying data by data classification according to an embodiment of the present invention.

Please refer to FIG. 1 and FIG. 5. FIG. 5 is a function block diagram illustrating a system 1 for simultaneously displaying data by data classification according to an embodiment of the present invention. As shown in FIG. 5, in the present embodiment, the system 1 for simultaneously displaying data by data classification comprises a server 10 and a multi-layer display 11. The server 10 and the multi-layer display 11 can communicate with each other through a communication interface (e.g., USB, Wi-Fi, Ethernet, etc.). The server 10 comprises an input module 101, a data classification module 102, a data arrangement module 103 and a data transmission module 104. The data classification module 102 is connected to the input module 101, the data arrangement module 103 is connected to the input module 101 and the data classification module 102, and the data transmission module 104 is connected to the data arrangement module 103. The multi-layer display 11 comprises a screen 111. In practice, the server 10 can be a cloud server, an edge computing device, a computer, etc. The input module 101 can be a mouse, a keyboard, the data classification module 102 and the data arrangement module 103 can be integrated into the chip, and the data transmission module 104 can be a data transmitter. Furthermore, the system 1 for simultaneously displaying data by data classification can comprise a database 15 connected to the server 10. The database 15 is configured to store the data to be displayed on the multi-layer display 11.

In the present embodiment, the input module 101 is configured to input a plurality of view angle zones and a data classification command corresponding to at least one data. The data classification module 102 is configured to analyze and classify the at least one data according to the view angle zones and a data classification command to generate a plurality of image data sets, and generate a plurality of buffer image data sets. The data arrangement module 103 is configured to arrange the image data sets according to the view angle zones, set a plurality of view angle buffer zones according to the view angle zones, and add the plurality of buffer image data sets among the image data sets according to the view angle buffer zones. Wherein, the view angle buffer zones are located between the view angle zones. The data transmission module 104 is configured to send the image data sets and the buffer image data sets. The screen 111 is configured to receive and simultaneously display the image data sets and the buffer image data sets transmitted by the data transmission module 104.

In practice, the input module 101 can also input a data capture command of the at least one data to be displayed on the multi-layer display 11, and the data classification module 102 can obtain the at least one data from the database according to the data capture command. Furthermore, the data classification module 102 can pre-store a classification model created by machine learning, and can analyze the data classification command and the at least one data through the classification model to generate the plurality of image data sets.

As shown in FIG. 1, FIG. 3 and FIG. 5, in practice, when the system 1 for simultaneously displaying data by data classification operates and outputs a plurality of static 2D images and/or 3D images, a user can input the number of view angle zones, the data capture command and the data classification command through the input module 101. At this time, the data classification module 102 can obtain the data of the plurality of 2D images and/or 3D images from the database 15 according to the data capture command, and generate the plurality of image data sets corresponding to the number of view angle zones according to the data classification command, the data of the plurality of 2D images and/or 3D images and the classification model. Wherein, the image data sets comprise the data of the 2D images and the data of the 3D images. The data classification module 102 can also generate the plurality of buffer image data sets. Next, the data arrangement module 103 sets the plurality of view angle buffer zones to be located between each of the two view angle zones according to the number of view angle zones, and arranges the image data sets and the plurality of buffer image data sets in the view angle zones and the view angle buffer zones correspondingly to generate the data arrangement set. The data arrangement module 103 also arranges the buffer image data sets on the two outer sides of all image data sets. Next, the data transmission module 104 sends the data arrangement set containing the image data sets and the buffer image data sets to the multi-layer display 11. Finally, the multi-layer display 11 receives the data arrangement set and the screen 111 displays the image data set and the buffer image data set, simultaneously. Notably, the multi-layer display 11 can control the screen 111 to display the buffer image data sets in the buffer view angle zones and can also control the screen 111 not to output the buffer image data sets in the buffer view angle zones, so as to avoid the crosstalk between the images presented by the image data sets.

In practice, when the system 1 for simultaneously displaying data by data classification of the present invention is applied to flight information, the sever 10 can divide the flight information into a plurality of flight data sets according to the data classification commands such as airline, flight number or boarding gate information, and set the number of view angle zones according to the number of flight data sets. Furthermore, the server 10 can arrange the plurality of flight data sets in alphabetical or numerical order, and insert all-black image data or low-resolution image data between the plurality of flight data sets to generate the data arrangement sets corresponding to the flight information. Finally, the screen 111 of the multi-layer display 11 displays the data arrangement sets of the flight information. Therefore, a traveler is able to find the corresponding view angle zones according to the passenger information to find the flight information desired by the traveler more quickly.

Furthermore, when the system 1 for simultaneously displaying data by data classification operates and outputs a plurality of static 2D/3D images and dynamic images with a time sequence, a user can input the number of view angle zones, the data capture command and the data classification command through the input module 101. At this time, the data classification module 102 can obtain the data of the plurality of 2D/3D images and the dynamic images from the database 15 according to the data capture command, and generate the plurality of image data sets corresponding to the number of view angle zones according to the data classification command, the data of the 2D/3D images, the data of the dynamic images and the classification model. Wherein, the image data sets comprise the data of the plurality of 2D/3D images and the data of the 3D images with different time points. The data classification module 102 can also generate the plurality of buffer image data sets. Next, the data arrangement module 103 sets the plurality of view angle buffer zones to be located between each of the two view angle zones according to the number of view angle zones, and arranges the image data sets of the 2D/3D images, the image data sets of the 3D images with different time points and the plurality of buffer image data sets correspondingly to generate the a plurality of data arrangement sets, and generate a plurality of image data with time sequence according to the time sequence. Next, the data transmission module 104 sends the plurality of image data with time sequence to the multi-layer display 11. Finally, the multi-layer display 11 receives the plurality of image data with time sequence and the screen 111 displays the plurality of image data with time sequence in order according to the time sequence.

In practice, when the system 1 for simultaneously displaying data by data classification of the present invention is applied to a product (e.g., shoes), the data to be presented on the screen 111 can include 2D product information and 3D dynamic images of the shoes. At this time, the server 10 arranges the 3D dynamic image data of the shoes in the first view angle zone and arranges the product information of the shoes in the second view angle zone, and transmits the arranged data to the multi-layer display 11 for displaying on the screen 111. Therefore, a viewer can see the 3D product appearance of the shoes (e.g., a 3D image of the shoes rotating horizontally in 360 degrees) on the first view angle zone of the screen 111, and simultaneously see the product information of the shoes (e.g., the brand, the product description, the price, etc.) on the second view angle zone of the screen 111, so as to enhance the visual experience.

Figure 6:
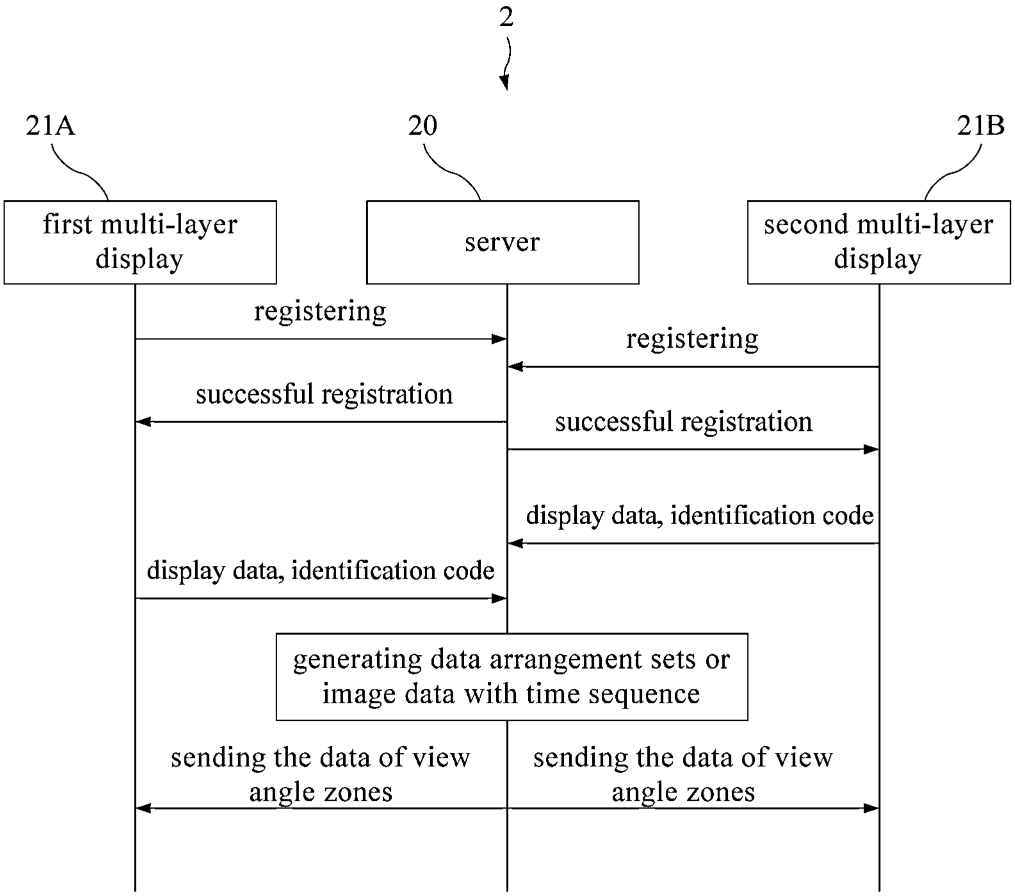
FIG. 6 is a sequence diagram illustrating a system for simultaneously displaying data by data classification applied to a plurality of multi-layer displays according to an embodiment of the present invention.

The system for simultaneously displaying data by data classification of the present invention can be applied to one multi-layer display, and can also be applied to a plurality of multi-layer displays. Please refer to FIG. 6. FIG. 6 is a sequence diagram illustrating a system 2 for simultaneously displaying data by data classification applied to a plurality of multi-layer displays according to an embodiment of the present invention. The present embodiment is based on the number of two multi-layer displays, but is not limited in practice. As shown in FIG. 6, a first multi-layer display 21A and a second multi-layer display 21B are located at different positions. The first multi-layer display 21A and the second multi-layer display 21B can be registered with a server 20 to communicate with the server 20. When the server 20 is connected to the first multi-layer display 21A and the second multi-layer display 21B, the first multi-layer display 21A and the second multi-layer display 21B can respectively transmit display data (e.g., dimensional data) and an identification code to the server 20. The server 20 can generate data arrangement sets or image data with time sequence corresponding to the first multi-layer display 21A and the second multi-layer display 21B according to the data to be displayed on the screen, the display data, and the identification code set by the user, and send the data arrangement sets or the image data with time sequence to the first multi-layer display 21A and the second multi-layer display 21B, respectively. Finally, the screen of the first multi-layer display 21A and the second multi-layer display 21B simultaneously displays the data arrangement sets or the image data with time sequence sent by the server 20. It should be noted that the functions of the server, the first multi-layer display and the second multi-layer display of the present embodiment are substantially the same as the server and the multi-layer display of the aforementioned embodiment, so it will not be described again herein.

In summary, the method and system for simultaneously displaying data by data classification of the present invention can enable the multi-layer display to simultaneously display different data contents at different angles by setting multiple view angle zones and classifying data, so the viewer can more quickly obtain specific information, so as to enhance convenience and efficiency. Moreover, the method and system for simultaneously displaying data by data classification of the present invention can separate different display images by buffering the image data to avoid crosstalk between the images. In addition, the method and system for simultaneously displaying data by data classification of the present invention can also display static and dynamic images in different view angle zones simultaneously, so as to enhance the practicality and applicability.

What is claimed is:

1. A method for simultaneously displaying data by data classification, comprising the following steps of:

setting a plurality of view angle zones of a multi-layer display;

analyzing and classifying at least one data according to the view angle zones and a data classification command to generate a plurality of image data sets, wherein the at least one data comprises a dynamic image with a time sequence;

arranging the image data sets according to the time sequence and the view angle zones to generate a plurality of image data with time sequence;

setting a plurality of view angle buffer zones located among the view angle zones, and adding a plurality of buffer image data sets among the image data sets according to the view angle buffer zones; and the multi-layer display simultaneously displaying the image data sets and the buffer image data sets and sequentially displaying the image data with time sequence according to the time sequence, the view angle zones and the view angle buffer zones.

2. The method for simultaneously displaying data by data classification of claim 1, wherein the step of setting the plurality of view angle zones of the multi-layer display further comprises the following step of:

receiving the at least one data and setting the plurality of view angle zones of the multi-layer display according to the at least one data.

3. The method for simultaneously displaying data by data classification of claim 1, wherein the step of setting the plurality of view angle buffer zones located among the view angle zones further comprises the following step of:

setting the plurality of view angle buffer zones located among the view angle zones and located at two outer sides of all view angle zones.

4. The method for simultaneously displaying data by data classification of claim 1, wherein the at least one data is at least one of 2D image and 3D image.

5. The method for simultaneously displaying data by data classification of claim 1, wherein the relationship between the view angle zones, the view angle buffer zones, the image data sets and the buffer image data sets is given by:

$$K = \delta * P + \lambda * Q$$

$$Q = P + 1$$

$$V_i = [v_i v_i \ldots v_i]_1 * \lambda, \text{ wherein } i = 1, 2, \ldots, P$$

$$B_i = [b_i b_i \ldots b_i]_1 * \delta, \text{ wherein } i = 1, 2, \ldots, Q$$

wherein, K is the total number of the image data sets, P is the number of the view angle zones, Q is the number of the view angle buffer zones, δ is the number of the image data sets, λ is the number of the buffer image data sets, vi is one of the image data sets, and bi is one of the buffer image data sets.

6. A system for simultaneously displaying data by data classification, comprising:

a server, further comprising:

an input module for inputting a plurality of view angle zones and a data classification command corresponding to at least one data;

a data classification module, connected to the input module and configured to analyze and classify the at least one data according to the view angle zones and a data classification command to generate a plurality of image data sets, and generate a plurality of buffer image data sets;

a data arrangement module, connected to the input module and the data classification module, the data arrangement module configured to arrange the image data sets according to the view angle zones, set a plurality of view angle buffer zones according to the view angle zones, and add the plurality of buffer image data sets among the image data sets according to the view angle buffer zones, wherein the view angle buffer zones are located between the view angle zones; and a data transmission module, connected to the data arrangement module and configured to send the image data sets and the buffer image data sets; and a multi-layer display, communicating with the server, the multi-layer display further comprising:

a screen for receiving and simultaneously displaying the image data sets and the buffer image data sets transmitted by the data transmission module;

wherein the at least one data comprises a dynamic image with a time sequence, the data arrangement module arranges the image data sets according to the time sequence and the view angle zones to generate a plurality of image data with time sequence, and the screen of the multi-layer display sequentially displays the image data with time sequence according to the time sequence, the view angle zones and the view angle buffer zones.

7. The system for simultaneously displaying data by data classification of claim 6, wherein the image data sets are at least one of 2D images and 3D images.

8. The system for simultaneously displaying data by data classification of claim 6, wherein each of the image data sets comprises a plurality of image data, and when the image data set is 2D image, data content of the image data is the same.

9. The system for simultaneously displaying data by data classification of claim 6, wherein data in the buffer image data sets are all-black images.

* * * * *